Aug. 19, 1947.  D. W. HIVELY  2,425,876
SAW SET
Filed Oct. 2, 1945  4 Sheets-Sheet 3
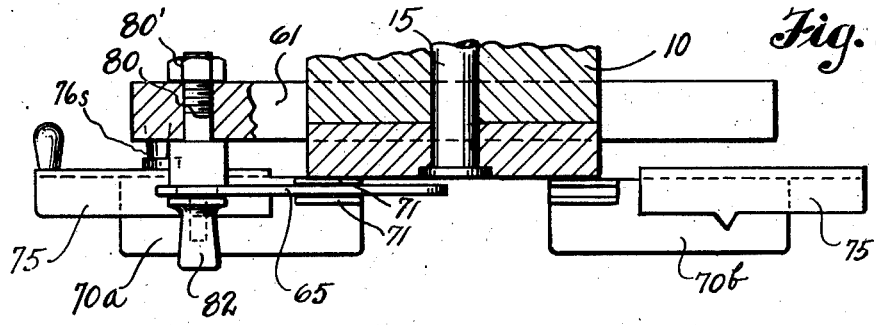
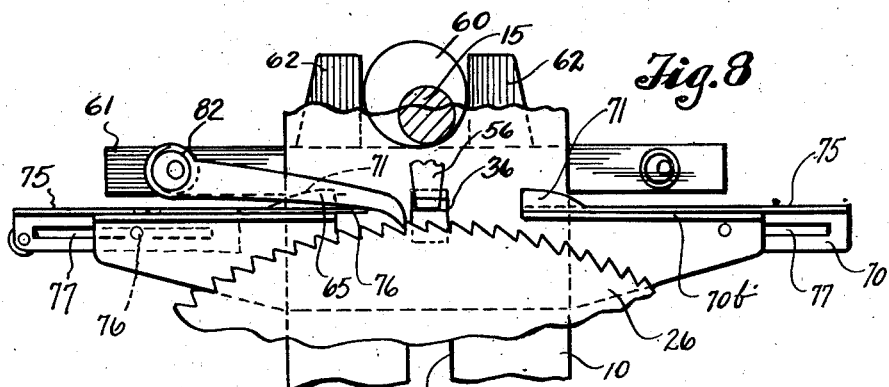
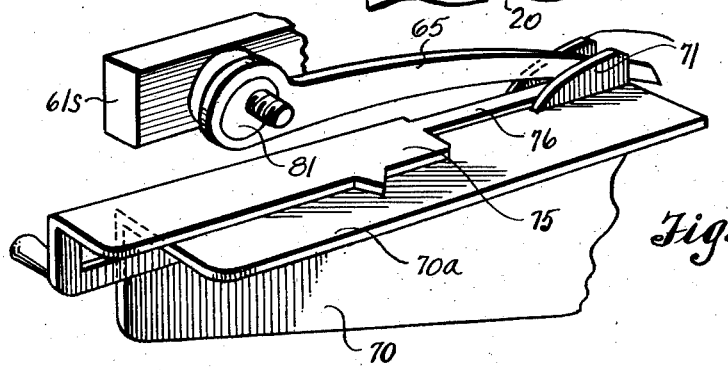
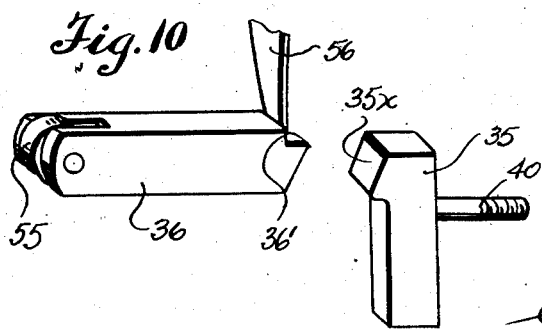
INVENTOR
DAVID W. HIVELY
BY
Cook & Robinson
ATTORNEYS

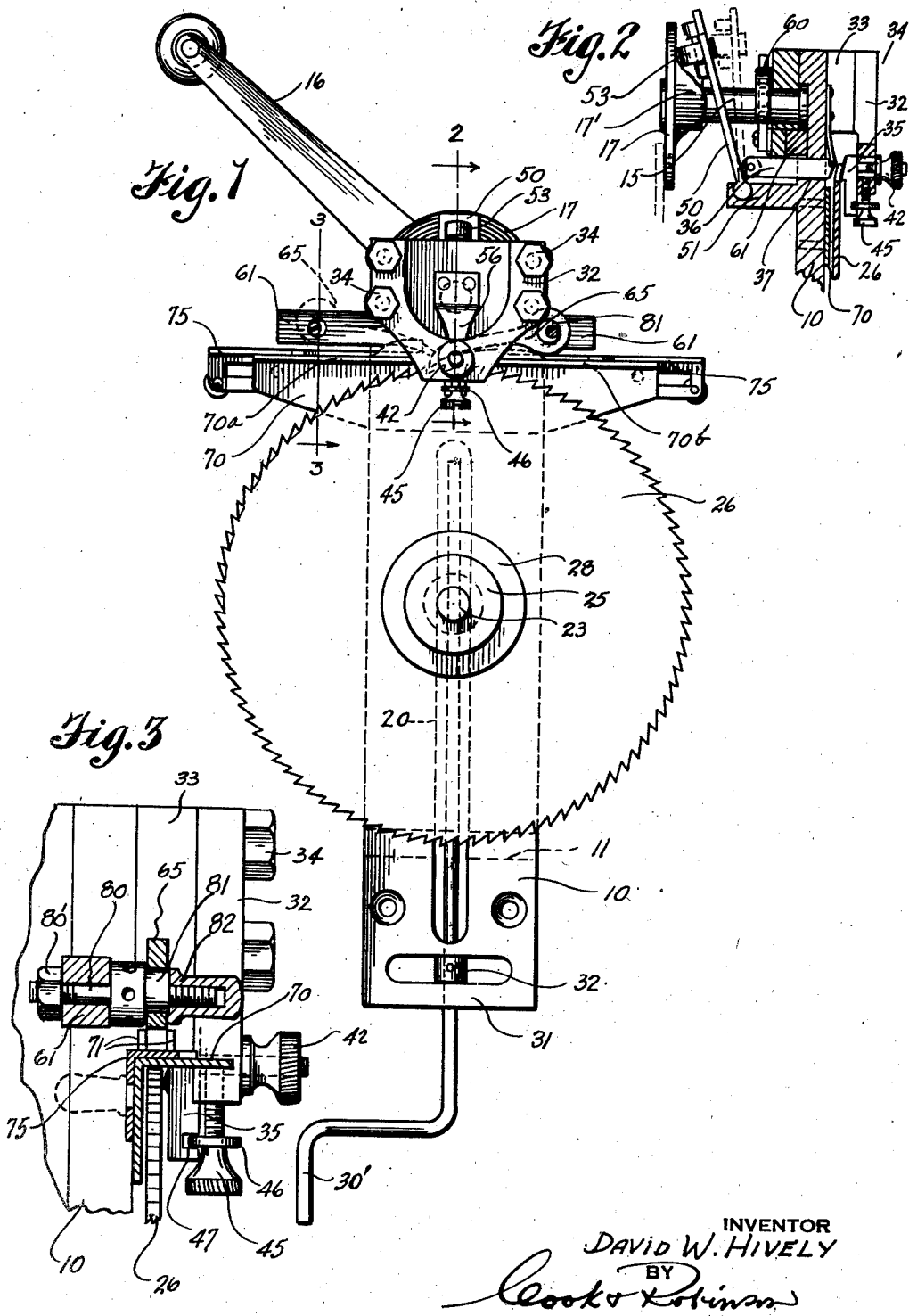
Aug. 19, 1947.  D. W. HIVELY  2,425,876
SAW SET
Filed Oct. 2, 1945  4 Sheets-Sheet 1
INVENTOR
DAVID W. HIVELY

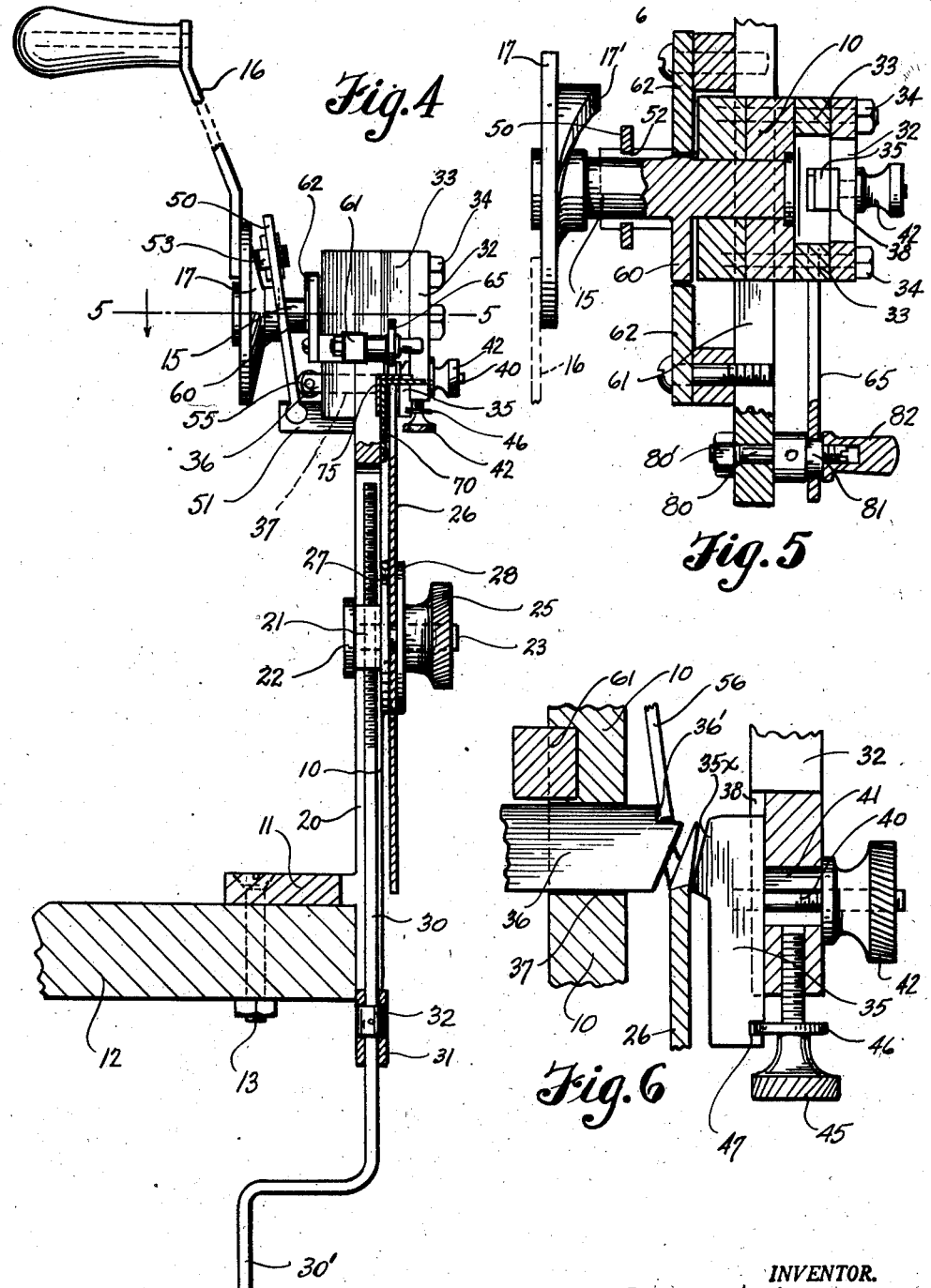

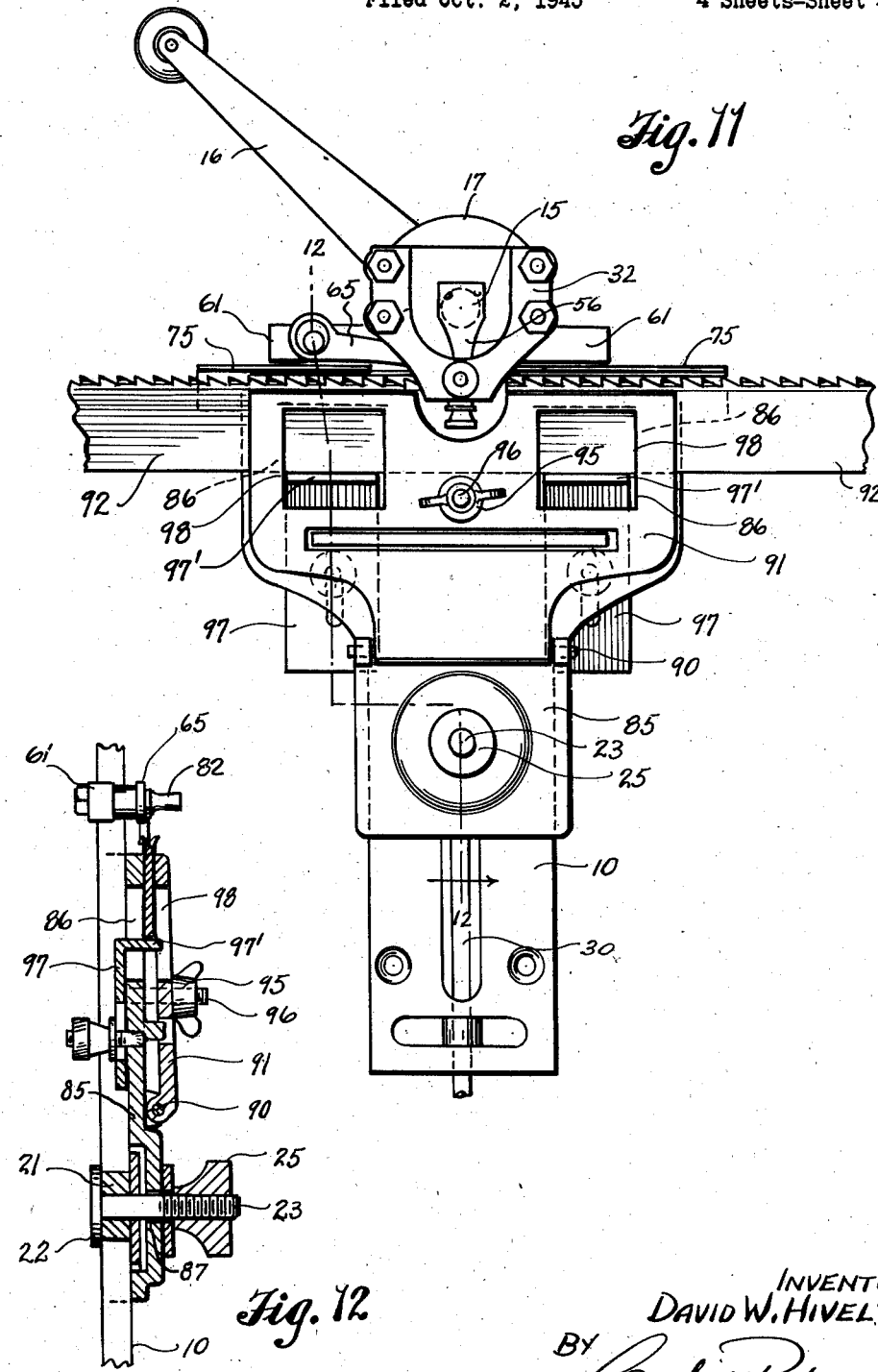

Patented Aug. 19, 1947

2,425,876

UNITED STATES PATENT OFFICE 2,425,876

SAW SET

David W. Hively, Seattle, Wash.

Application October 2, 1945, Serial No. 619,868

4 Claims. (Cl. 76—68)

This invention relates to improvements in saw sets, and it has reference more particularly to saw sets of that kind in which a saw may be mounted and whereby its teeth may be mechanically set exact and uniform amounts and also whereby the saw may be automatically advanced after each tooth setting operation to place the next tooth thereof of like kind in position for setting.

It is the principal object of this invention to provide an automatic saw setting device of the above stated character that will accommodate itself to disk, band or straight saws and which had feeding mechanism that may be adjusted to accommodate it to saws having various numbers of teeth per inch and wherein means is provided for determining and obtaining any exact amount of set.

It is also an object of this invention to provide a mechanical, saw setting device that will rapidly and efficiently accomplish the work for which it is intended.

Still further objects of the invention reside in the details of construction of parts, in their relationship, combination and sequence of operation, as will hereinafter be fully described.

In accomplishing these and other objects of the invention, I have provided the improved details of construction, the preferred forms of which are illustrated in the accompanying drawings, wherein—

Fig. 1 is a front view of a saw setting device embodied by the present invention, showing the mounting of a disk saw therein for the setting of its teeth.

Fig. 2 is a sectional detail on line 2—2 in Fig. 1, particularly showing the relationship of saw, hammer and anvil.

Fig. 3 is an enlarged sectional detail, on line 3—3 in Fig. 1.

Fig. 4 is a side elevation of the device, with some of its parts shown in section for better understanding and illustration.

Fig. 5 is an enlarged, horizontal, sectional detail taken on line 5—5 in Fig. 4.

Fig. 6 is an enlarged, sectional view of the hammer and anvil portion of the device, particularly illustrating the means for adjusting the position of the anvil relative to the saw.

Fig. 7 is a plan view of the saw feed mechanism.

Fig. 8 is a front view of the same, particularly showing the feeding pawl and its eccentric pivoted mounting.

Fig. 9 is a perspective view of the means for determining the extent of feeding action of the pawl.

Fig. 10 is a perspective view of the hammer, anvil and associated parts for setting the teeth.

Fig. 11 is a front view of the device as equipped with means for the support of a band saw for setting its teeth.

Fig. 12 is a section on line 12—12 in Fig. 11.

Referring more in detail to the drawings—

The present device is in the nature of a bench tool or fixture in that it is designed for mounting on or for attachment to a bench or table top. In its present preferred form of construction, as equipped for setting the teeth of the ordinary types of disk saws, the device comprises a flat, upright bar or standard 10, formed at a distance spaced from its lower end with a horizontal flange 11. When the lower end of the standard is placed flatly against the edge of a table top, this flange is adapted to overlie the top adjacent the edge, and to be fixed solidly thereto. In Fig. 4, I have shown a part of a table top at 12, and have shown the standard as being applied and attached thereto by screw bolts 13 passing through the flange and table top.

In a practical form of device now being used, the standard 10 extends about one foot above the flange and near its upper end it rotatably mounts a horizontally extending shaft 15 therein. This is the operating shaft, and it is equipped at its inner end with a crank arm 16 whereby it may be rotated. The crank arm 16 is here shown as being attached to a cam wheel 17 that in turn is fixed to the shaft 15 for a purpose presently explained.

The standard, or bar 10, is formed with a longitudinal slot 20 extending from near its lower end to near the upper end, and slidably contained in this slot is a block 21 having an integral head 22 adapted to slidingly engage with the standard at its inner side and along opposite sides of the slot. At the front side of this block there is a forwardly extending stud 23 for mounting a disk saw thereon for setting. This is accomplished by passing the stud through the center opening of the saw disk. Threaded onto the outer end position of the stud is a nut 25 whereby the saw may be held properly in place for sharpening. In placing the disk saw on the stud for setting, such a saw being designated at 26 in Figs. 1 and 4, it is located between washers 27 and 28 which are also applied to the stud. Then the nut 25 is tightened to cause the saw to be gripped between the washers. The washers are slidably keyed on the stud and held thereby against rotation, and the tension against the saw may be so adjusted as to keep it from free turning and under just the right tension for accurate feeding.

The adjustment of the block 21 up or down in the slot 20 is accomplished by means of an adjusting screw shaft 30 that is contained in the slot, and is threaded vertically through the block, as best shown in Fig. 4. This shaft extends through a bearing portion 31 at the lower end of the bar 10 where it is rotatably held by means of a collar 32 that is fixed to the shaft. At its lower end, the shaft 30 is equipped with a crank 30' for easy turning and quick and accurate up or down adjustment of the saw.

With a saw mounted on the stud as described, it is anticipated that it shall be adjusted to accurately locate its top, peripheral portion, that is its toothed edge portion, between an anvil and hammer whereby the teeth are set. The anvil and hammer will later be fully described.

By referring more particularly to Figs. 1 and 2, it is to be observed that a U-shaped plate 32 is fixed solidly to the upper end portion of the standard 10, outwardly spaced therefrom by interposed blocks 33 and is held solid by bolts 34 passing therethrough and into the standard.

As shown in Fig. 2, the toothed top edge portion of the saw 26 is located between the standard and lower part of plate 32. An anvil bar 35 is fixed in the inner face of the plate 32 and the tooth setting hammer 36 is reciprocally slidable in a guide way 37 in the standard 10. The hammer and anvil are aligned with the saw teeth and are located at opposite sides of the saw.

Referring more particularly to Fig. 6, it is there shown that the anvil comprises the vertical bar 35 and that this bar is slidably fitted in a vertical channel or groove 38 in the inner face of plate 32. A stud 40 extends from bar 35 outwardly and through a slot 41 in the plate. A nut 42 threaded on the outer end of the stud may be tightened against the plate to aid in securing the anvil at any selected position of vertical adjustment. The vertical adjustment of the anvil may be accurately made and held by a set screw 45 that is threaded upwardly into the lower end of plate 32. This screw has an annular flange 46 integral therewith. The peripheral edge of the flange is contained in a slot 47 across the lower end of the anvil. When the nut 42 is loose, the screw 45 may be turned to shift the anvil up or down, and the adjustment is then retained by tightening the nut 42.

On its inner face, near its upper end, the anvil bar 35 has an inwardly and downwardly sloping head 35x best seen in Figs. 6 and 10, against which the saw teeth are set by the action of the hammer, and they may be set to more or less extent by adjusting the anvil up or down relative to the tooth as presently understood.

The hammer 36 comprises a horizontally disposed bar 36 that is adapted to be reciprocally actuated through the mediacy of the crank arm 16, and the cam 17, previously mentioned, and a cam actuated lever 50. The lever 50 is vertically disposed, with its lower end pivoted on a bearing block 51 that extends rearwardly from the standard 10 slightly below the level of the hammer. In the body portion of the lever there is an opening 52 through which the crank shaft 15 passes as seen in Fig. 5, and at its upper end it mounts a roller 53 that has rolling contact with the cam wheel 17. Near its lower end the cam lever is engaged by a roller 55 that is mounted in the inner end of the hammer bar 36. At its outer end, the hammer is formed with a shoulder 36' that is engaged by an inwardly pressing leaf spring 56 that is fixed to the front face of standard 10 as best shown in Fig. 2. This spring keeps the hammer back against the lever 50 and the latter against the cam as the shaft 15 is rotated.

The arrangement and construction of parts just described is such that, with each rotation of the crank shaft and cam, the cam rise shown at 17' in Fig. 5, will cause the upper end of the cam lever 50 to swing inwardly, and this will push the hammer 36 inwardly. The saw, when properly placed for setting its teeth, is so disposed that a tooth thereof will be located between the hammer and anvil, with the base of the tooth in close contact with the lower edge of the anvil head surface 35x. Thus, when the hammer moves outwardly, its outer end will engage the inside of the tooth and will set the tooth out against the anvil. It is also to be observed by reference to Fig. 6 that the end of the hammer is inclined and will substantially conform to the inclined face of the saw tooth when it is properly set out against the anvil.

The automatic feeding or advancing of the saw in synchronism with the action of the hammer is accomplished by means best shown in Figs. 5, 7, and 8. It is the purpose of this feeding mechanism to advance the saw disk one interval after each setting operation of the hammer; one interval being the interval between teeth faced in the same direction. This feeding mechanism comprises cam wheel 60 formed eccentrically on shaft 15 at the back side of the standard and a horizontal slide bar 61 that is reciprocally contained in the standard in a horizontal guideway that passes just below the shaft 15. Fixed on the bar 61 near its ends are brackets 62—62 which contain the eccentric cam 60 between them in such manner that as the cam rotates, it causes the synchronized reciprocal action of the slide bar.

Mounted on the slide bar, near one end, is a pawl 65 that lies in a substantially horizontal position in the plane of the saw disk and above the saw, with the free end of the pawl adapted to engage with teeth of the saw disk when the slide moves inwardly thereby to advance the saw. The reciprocal travel of the bar 61 is somewhat greater than any interval of advancement of the saw and therefore provision is made that the effective action of the pawl is adjustable and accurately determinable. For determining this action of the pawl, I provide a horizontal, shelf-like bracket 70 at the front side of the standard. This shelf is just below the level of the slide bar and its medial portion is cut away providing, in effect, two horizontal shelves that are located at opposite sides of the plate 32. These are designated by reference numerals 70a and 70b in Figs. 1, 7, and 8.

At the inner end of each shelf are spaced guide flanges 71—71 and it is between these flanges of the shelf being used that the inner end portion of the pawl 65 is guided in its reciprocal action. This is shown best in Fig. 9.

Adjustable along each shelf are slides 75, each equipped with an inwardly extending finger 76 at its inner end disposed between the guide flanges 71—71 of the corresponding shelf. The free end of the feed pawl rides upon the inner end of the finger of the corresponding slide. Thus, by adjusting the slide 75 inwardly or outwardly along its shelf, the pawl may be caused to engage the toothed portion of the saw at near the end of its inward stroke or at an earlier time so as to advance the saw more or less according to the required interval which, of course, is different for saws of different size and saws having more or less teeth per inch.

The adjustment of the slides 75 may be secured by the tightening of set screws 76s which pass through longitudinal slots 77 in the slides and are threaded into the bracket 70 as shown in Fig. 8.

For obtaining an accurate setting of the feed pawl relation to the slide, it is pivotally attached to the feed slide bar by a pivot bolt 80 that has an eccentric journal 81 on which the pawl pivots. The bolt is held in a set non-rotating position by a clamp nut 80' applied to its inner end, that may be tightened against the slide bar. When this nut is loosened, the pivot bolt may be rotatably adjusted and, through the mediacy of the eccentric journal 81, the pawl will be advanced or retracted relative to the slide bar so that it will advance the saw tooth to the exact position required relative to the anvil and hammer. A thumb nut 82 is applied to the forward end of bolt 80 to retain the pawl on the journal 81. This is best shown in Fig. 3. The pawl is interchangeably used on each end of the slide bar depending upon which way it is desired to turn the saw in the setting operation.

To adapt the device for the setting, the teeth of band saws, meat saws and the like, where a saw band or blade is of uniform width, I have provided a saw supporting frame shown in Figs. 11 and 12. This comprises a plate 85 adapted to be placed flatly against the front of the standard 10 for securement. In its lower end portion, the plate has an opening 87 to receive the stud 23 therethrough for securement of the plate to the standard by the nut 25. In the upper portion of the plate at opposite sides, are openings 86—86. The top edge of the plate 85 is located against or near the under sides of shelves 70a and 70b.

Hingedly attached to the front of the plate 85 by means of a hinge pin 90 through its lower edge, is a clamp plate 91. When a saw, such as a meat saw or band saw as indicated at 92, is to be sharpened, it is placed flatly against plate 85, as in Fig. 11, and is held by clamp plate 91. This latter plate is drawn against the saw by a clamp nut 95 that is applied to a bolt 96 that is fixed in plate 85 and extended through a hole in plate 91.

Vertically adjustable brackets 97 are mounted on the back side of plate 85, and these have supports 97' at their upper ends that extend out through the openings 86 in plate 85 and registering openings 98 in plate 91 at opposite sides and these may be set against the bottom edge of the saw band to support it in proper elevation relative to hammer and anvil. The feeding action for such a saw is like that for a disk saw and the same means is employed.

Assuming the device to be so constructed, it will be understood that in using it, it is only required that the saw be first properly adjusted to position and the feeding pawl travel be properly determined, then the rotation of the crank arm 16 causes the automatic setting action of the hammer and the automatic, synchronized advancing of the saw one interval after each setting operation.

Having thus described my invention, what I claim as new therein and desire to secure by Letters Patent is:

1. A saw set of the character described comprising a frame structure, a tooth setting anvil mounted therein, a tooth setting hammer reciprocally mounted in the frame structure for endwise movement toward and from the anvil, means associated with the frame structure for mounting a saw in a manner permitting advance movements thereof without change in setting relative to the hammer, whereby teeth thereof may be brought successively into position between the anvil and hammer for setting thereby, a crank shaft rotatably mounted in the frame structure, a slide bar reciprocally mounted in the frame structure for movement parallel with the line of advancement of the saw, a cam wheel and an eccentric on the crank shaft, a lever pivotally mounted in the frame and engaged with the cam wheel for actuation thereby and engaged with the hammer to move it toward the anvil for a tooth setting operation, means on the slide bar and engaging the eccentric to cause reciprocal action of the slide with rotation of the shaft in synchronism with the hammer action, and a pawl on the slide arranged to engage with teeth of the saw to advance the saw a definite interval while the hammer is being retracted from the anvil, said hammer and anvil having beveled surfaces to engage opposite sides of the tooth to set it, and said anvil being adjustable in a direction toward or from the point of the tooth to determine the amount of set.

2. A saw set as in claim 1 including a support across which the free end of the pawl moves into and from contact with the saw teeth for advancement of the saw; said support being adjustable in the direction of travel of the pawl to cause the pawl to be effective through more or less of its advance stroke thereby to determine the exact interval of advancement of the saw.

3. A saw set as recited in claim 1 wherein the pawl is mounted at one end on the said slide bar by a pivot bolt, and wherein there is a stationary support across which the free end of the pawl moves, as the bar reciprocates, into and from contact with teeth of the saw to effect its advancement; said support being adjustable to permit the pawl to be effective through more or less of its stroke thereby to determine the exact interval of advancement of the saw, and said pivot bolt having an eccentric journal mounting the pawl therein, and being rotatably adjustable in the bar to change the position of the pawl relative to the bar.

4. In a saw set of the character described, a frame structure including a standard adapted for fixed securement to a support, a shaft rotatably mounted in the standard and equipped with a crank for its rotation, a cam wheel and an eccentric on the shaft, a slide bar mounted in the frame and equipped with means engaging said eccentric for the reciprocal actuation of the slide in unison with rotation of the shaft, a lever pivotally mounted in the frame and engaging said cam wheel for oscillation thereby, in unison with the rotation of the shaft, an anvil fixed in the frame structure, a tooth setting hammer reciprocally mounted in the frame structure for movement toward and from the anvil for the setting of a saw tooth located between them; yieldable means urging the hammer outwardly; said hammer having a wheel at its outer end engaged by the lever for the inward actuation of the hammer for each tooth setting operation, means for mounting a saw on the frame with its line of teeth located between the hammer and anvil and a pawl on the slide adapted to engage the teeth of the saw to advance the saw a predetermined tooth interval with each turn of the shaft and following each tooth setting operation of the hammer to locate the next like tooth of the saw in position for setting.

DAVID W. HIVELY.

REFERENCES CITED

The following references are of record in the file of this patent:

UNITED STATES PATENTS

| Number | Name | Date |
|---|---|---|
| 325,035 | Winston | Aug. 25, 1885 |
| 616,935 | Kent | Jan. 3, 1899 |
| 661,647 | Saxton | Nov. 13, 1900 |
| 1,241,772 | Serfozo | Oct. 2, 1917 |
| 1,828,392 | Carpenter | Oct. 20, 1931 |
| 1,268,681 | Chalender | June 4, 1918 |
| 1,088,941 | Swainston | Mar. 3, 1914 |
| 1,468,986 | Wilthil | Sept. 25, 1923 |
| 923,266 | Holmes | June 1, 1909 |
| 2,343,171 | Collier | Feb. 29, 1944 |
| 2,356,448 | Daggett | Aug. 22, 1944 |
| 1,152,256 | Worthington | Aug. 31, 1915 |
| 1,205,072 | Anderson et al. | Nov. 14, 1916 |
| 1,258,734 | Anderson et al. | Mar. 12, 1918 |
| 1,909,832 | Jirka | May 16, 1933 |
| 1,966,364 | Thrasher | July 10, 1934 |